(12) United States Patent
Pishehvari et al.

(10) Patent No.: US 11,378,653 B2
(45) Date of Patent: Jul. 5, 2022

(54) METHOD FOR INCREASING THE RELIABILITY OF DETERMINING THE POSITION OF A VEHICLE ON THE BASIS OF A PLURALITY OF DETECTION POINTS

(71) Applicant: Aptiv Technologies Limited, St. Michael (BB)

(72) Inventors: Ahmad Pishehvari, Wuppertal (DE); Stephanie Lessmann, Erkrath (DE); Uri Iurgel, Wuppertal (DE)

(73) Assignee: Aptiv Technologies Limited, St. Michael (BB)

( * ) Notice: Subject to any disclaimer, the term of this patent is extended or adjusted under 35 U.S.C. 154(b) by 848 days.

(21) Appl. No.: 16/244,650

(22) Filed: Jan. 10, 2019

(65) Prior Publication Data

US 2019/0227145 A1 Jul. 25, 2019

(30) Foreign Application Priority Data

Jan. 25, 2018 (EP) .................................... 18153440

(51) Int. Cl.
*G01S 7/41* (2006.01)
*G01S 13/08* (2006.01)
(Continued)

(52) U.S. Cl.
CPC .............. *G01S 7/41* (2013.01); *G01S 7/4808* (2013.01); *G01S 13/08* (2013.01); *G01S 13/931* (2013.01); *G01S 17/08* (2013.01); *G01S 17/931* (2020.01)

(58) Field of Classification Search
CPC ........ G01S 7/41; G01S 17/931; G01S 7/4808; G01S 13/08; G01S 13/931; G01S 17/08
See application file for complete search history.

(56) References Cited

U.S. PATENT DOCUMENTS 8,558,733 B2 10/2013 Kamo et al.
8,633,849 B2 1/2014 Shibata et al.
(Continued)

FOREIGN PATENT DOCUMENTS

CN 111366164 7/2020
DE 10148062 4/2003
(Continued)

OTHER PUBLICATIONS

"Non-Final Office Action", U.S. Appl. No. 16/241,404, dated Nov. 17, 2021, 23 pages.
(Continued)

*Primary Examiner* — Elias Desta
(74) *Attorney, Agent, or Firm* — Sawtooth Patent Group PLLC

(57) ABSTRACT

A method for increasing the reliability of determining the position of a vehicle on the basis of a plurality of detection points is described, the plurality of detection points being acquired using a radio-based and/or an optical sensor system, in particular a radar system, of a vehicle receiving electromagnetic signals from a vicinity of the vehicle, and each of the plurality of detection point representing a location in the vicinity of the vehicle, wherein the method comprises for each detection point of at least a subset of the plurality of detection points: determining at least one geometrical object associated with the detection point; determining at least one group of detection points from the subset sharing the at least one geometrical object; determining a quantity of detection points in the at least one group; evaluating a weight which represents the quantity of detection points in the at least one group on a predefined scale, and processing the detection point with respect to the weight.

20 Claims, 11 Drawing Sheets

(51) Int. Cl.
  *G01S 7/48* (2006.01)
  *G01S 17/08* (2006.01)
  *G01S 13/931* (2020.01)
  *G01S 17/931* (2020.01)

(56) References Cited

U.S. PATENT DOCUMENTS

| | | | |
|---|---|---|---|
| 9,041,588 | B2 | 5/2015 | Yasugi et al. |
| 9,199,643 | B1 | 12/2015 | Zeng |
| 9,618,608 | B2 | 4/2017 | Mizutani et al. |
| 10,235,975 | B2 * | 3/2019 | Sunkara ............ G06F 3/14 |
| 10,286,916 | B2 * | 5/2019 | Prasad ............ G01S 7/411 |
| 2005/0259002 | A1 | 11/2005 | Erario et al. |
| 2012/0313806 | A1 * | 12/2012 | Katoh ............ G01S 13/931 |
| | | | 342/52 |
| 2014/0043185 | A1 | 2/2014 | Ouellec et al. |
| 2015/0022392 | A1 | 1/2015 | Hegemann et al. |
| 2016/0139255 | A1 | 5/2016 | Bueschenfeld et al. |
| 2018/0067491 | A1 | 3/2018 | Oder et al. |
| 2020/0217943 | A1 | 7/2020 | Pishehvari et al. |
| 2021/0141091 | A1 | 5/2021 | Pishehvari et al. |
| 2021/0164800 | A1 | 6/2021 | Lessmann et al. |
| 2021/0213962 | A1 | 7/2021 | Pishehvari et al. |
| 2021/0396862 | A9 | 12/2021 | Pishehvari et al. |

FOREIGN PATENT DOCUMENTS

| | | |
|---|---|---|
| DE | 102016205227 | 10/2017 |
| DE | 102016214030 | 2/2018 |
| EP | 1 584 520 A2 | 10/2005 |
| EP | 3517996 | 7/2019 |
| WO | 2011023244 | 3/2011 |

OTHER PUBLICATIONS

"Extended European Search Report", EP Application No. 19207813.7, dated May 29, 2020, 15 pages.
"Extended European Search Report", EP Application No. 20151644.0, dated May 29, 2020, 15 pages.
"Extended European Search Report", EP Application No. 18153439.7, dated Sep. 12, 2018, 14 pages.
"Extended European Search Report", EP Application No. 19212492.3, dated Jun. 2, 2020, 14 pages.
"Foreign Office Action", EP Application No. 1853439.7, dated Jul. 14, 2020, 5 pages.
"Foreign Office Action", EP Application No. 18153439.7, dated Dec. 4, 2020, 5 pages.
Besl, et al., "A Method for Registration of 3-D Shapes", Feb. 1992, pp. 239-255.
Biber, "The Normal Distributions Transform: A New Approach to Laser Scan Matching", Nov. 2003, 6 pages.
Borenstein, et al., "Correction of Systematic Odometry Errors in Mobile Robots", Aug. 1995, pp. 569-574.
Bosse, et al., "Histogram Matching and Global Initialization for Laser-only SLAM in Large Unstructured Environments", Apr. 2007, pp. 4820-4826.
Burnikel, et al., "How to Compute the Voronoi Diagram of Line Segments: Theoretical and Experimental Results", Max Planck Institute for Informatics, DOI: 10.1007/BFb0049411, Apr. 2006, 14 pages.
Censi, "An ICP Variant Using a Point-to-line Metric", Jun. 2008, 7 pages.
Censi, et al., "Scan Matching in the Hough Domain", Jan. 2005, 6 pages.
Checchin, et al., "Radar Scan Matching SLAM using the Fourier-Mellin Transform", Jan. 2009, 10 pages.
Cole, et al., "Using Laser Range Data for 3D Slam in Outdoor Environments", Jun. 2006, 9 pages.
Diosi, et al., "Laser Scan Matching in Polar Coordinates with Application to SLAM", Sep. 2005, 6 pages.
Haklay, et al., "OpenStreetMap: User-Generated Street Maps", Oct. 2008, pp. 12-18.
Levinson, et al., "Robust Vehicle Localization in Urban Environments Using Probabilistic Maps", Jun. 2010, 7 pages.
Lingermann, et al., "Indoor and Outdoor Localization for Fast Mobile Robots", Jan. 2004, 6 pages.
Lu, "Robot Pose Estimation in Unknown Environments by Matching 2D Range Scans", Nov. 1997, pp. 249-275.
Minguez, et al., "Metric-Based Iterative Closest Point Scan Matching for Sensor Displacement Estimation", Nov. 2006, 7 pages.
Nister, et al., "Visual Odometry", Jul. 2004, 8 pages.
Pishehvari, et al., "Ego-pose estimation via Radar and Openstreetmap-based Scan matching", May 2018, 8 pages.
Pishehvari, et al., "Robust Range-Doppler Registration with HD Maps", Apr. 2020, 9 pages.
Schwertfeger, et al., "Map Evaluation Using Matched Topology Graphs", Sep. 2015, 27 pages.
Kirchner A et al: "Der Laserscanner ALS Intelligenter KZF-Sensor", Jan. 1, 1998, pp. 26-32, 34.
Streller D et al: "Object Tracking in Traffic Scenes With Multi-Hypothesis Approach Using Laser Range Images", Sep. 30, 2001, 8 pages.

* cited by examiner

METHOD FOR INCREASING THE RELIABILITY OF DETERMINING THE POSITION OF A VEHICLE ON THE BASIS OF A PLURALITY OF DETECTION POINTS

TECHNICAL FIELD OF INVENTION

The invention relates to a method for increasing the reliability of determining the position of a vehicle.

BACKGROUND OF INVENTION

The plurality of detection points is acquired using a radio-based and/or an optical sensor system, in particular a radar system, of a vehicle receiving electromagnetic signals from a vicinity of the vehicle, and each of the plurality of detection points representing a location in the vicinity of the vehicle. Preferably, detection points are acquired by emitting a plethora of electromagnetic signals from the radio-based and/or optical sensor system. At least a portion of the emitted signals will usually hit an object, e.g., a static landmark, in the vicinity of the vehicle, wherein the signal is reflected at the object in a direction towards the sensor system of the vehicle where the signal is received. The emitted signal and the received signal can then be compared in order to evaluate the location of the point of reflection on the object, i.e. the location associated with the detection point. In the case of radar for example, the Doppler-frequency shift between the signals may be used in addition to a transit-time difference of the signals for evaluating the location associated with the detection point.

As the skilled person understands the plethora of emitted signals will usually result in a plethora of detection points ("cloud of points") because of a plurality of objects around the vehicle. Although this forms a broad basis for determining the position of the vehicle and thus may in principal be good for achieving a high accuracy of the determined position, it is known that a non-negligible portion of the detection points acquired during a scan are in fact non-valid. Such non-valid detection points do not represent actual locations in the vicinity of the vehicle at which an emitted signal has actually been reflected. Instead, the non-valid detection points can result from other sources of electromagnetic radiation and may also be caused by processing errors and noise in the sensor system. In many cases, the locations represented by such non-valid detection points will have a large distance to other valid detection points and are thus denoted as outliers. Such outlier detection points can cause significant errors in the determined position of the vehicle. In particular, outlier detection points may significantly corrupt a process of determining the position of the vehicle involving a matching between the detection points and reference data, which can be denoted as scan matching. The problem of outliers is particularly virulent when the detection points are acquired by means of radar because radar is significantly prone to produce outlier detection points as compared to other sensor means, e.g., laser.

SUMMARY OF THE INVENTION

Described herein is a method for increasing the reliability of determining the position of a vehicle on the basis of a plurality of detection points.

The method comprises, for each detection point of at least a subset of the plurality of detection points: determining at least one geometrical object associated with the detection point; determining at least one group of detection points from the subset sharing the at least one geometrical object; determining a quantity of detection points in the at least one group; evaluating a weight which represents the quantity of detection points in the at least one group on a predefined scale; and processing the detection point with respect to the weight.

One aspect is to weight the detection points with respective weights. A weight can be a scalar quantity. An application of a weight to a given detection point can be carried out in any mathematical way suitable for modifying the importance of the detection point according to the weight. For example, the weight can be integrated into the procedure of determining the position of the vehicle in such a way that a detection point with a small weight has less influence on the calculated position than a detection point with a big weight. In this way, it is possible to influence the impact of individual detection points on the determined position. A weight can be a measure of trust into the detection point. Having regard to the problem of outliers explained above, it is possible to assign a potential outlier a lower weight, thereby lowering the risk that this potential outlier will significantly corrupt the accuracy of the determined position.

An advantage of the proposed weighting scheme is that a hard thresholding, i.e. in the sense of binarily classifying the detection points into bad and good ones, is avoided. Instead, the weighting can take account for a gradual display of the validity of the detection points. This is in line with a probabilistic approach, wherein the validity of detection points can only be estimated and not be predicted with hundred percent certainty. It has been found that the examples of the weighting approach described herein are all capable to increase the reliability and accuracy of the determined position.

A geometrical object is determined for each detection point. The geometrical object can have an arbitrary form and can be interpreted as a construction for describing a neighbourhood of a given detection point with respect to surrounding detection points. An underlying assumption of this approach is that a greater number of detection points in the neighbourhood may indicate that the respective detection point has a higher validity and should thus be assigned a higher weight.

A number of detection point can share one geometrical object if the detection points are, e.g., located on the geometrical object or if they are enclosed by the geometrical object. As such, all detection points which share the same geometrical object form one group of detection points which are associated with the respective object. The number of groups can be defined by the number of objects sharing at least one detection point. The quantity of detection points sharing a geometrical object can simply be the number of detection points on and/or within the geometrical objects. However, as the skilled person understands, a quantity of detection points may also be expressed by derived figures representative of the number of detection points. Moreover, objects may overlap each other and a detection point can simultaneously share more than one object, for example two different types of objects.

The weight, which is evaluated for each detection point, is expressed on a predefined scale so that the weights across all detection points are comparable with each other in a sensible way, thereby also ensuring that the subsequent the processing of the detection points with respect to the weights is well defined.

Advantageous embodiments are disclosed in the dependent claims, the description and the drawings.

Having regard to expressing the weights on a predefined scale, in one embodiment, evaluating the weight comprises identifying, from all determined quantities, a maximum quantity with respect to the at least one group. Afterwards, all determined quantities are normalized to the maximum quantity.

In a preferred embodiment, processing of the detection point with respect to the weight comprises modifying a representation of the uncertainty of the detection point in accordance with the weight, wherein the representation of the uncertainty is scaled inversely to the weight. The uncertainty of the detection point can be due to the measurement and can thus represent a measurement uncertainty of the sensor system. The uncertainty can be a parametric function with parameters which may significantly influence the uncertainty of the detection point, such as the distance between the sensor system and the location represented by the detection point and the angle between this location and a central line of sight of the sensor system or a sensor thereof.

Scaling the uncertainty inversely with respect to the weight can have the effect of increasing the uncertainty the less weight should be given to the detection point. Therefore, the increased uncertainty can be taken into account during determination of the position, thereby reducing the impact of the weighted detection on the result. The uncertainty can be expressed in terms of a variance and/or a covariance.

In one embodiment, the representation of the uncertainty is formed by a predefined covariance matrix, wherein an inverse representation of the weight is multiplied with at least a portion of the covariance matrix. Preferably, all entries of the covariance matrix can be multiplied with the weight. As the case may be, the scale of the weights or a modified version thereof can have a lower bound equal to one. By multiplying the entries of the covariance matrix, these entries either remain unchanged (weight equal to one) or are increased in accordance with the weight (weight greater than one). In this way, the predefined uncertainty, which may be derived from one parametric function associated with the sensor system, will not be reduced. In particular, it is ensured that the uncertainty will not be reduced to optimistically, thereby increasing the reliability of the determined position.

According to a preferred embodiment the weight includes a first weighting factor and/or a second weighting factor, wherein each weighting factor can be formed as described before with regard to the weight. This means that the first weighting factor represents a quantity of detection points in a first group of detection points and the second weighting factor represents a quantity of detection points in a second group of detection points. Furthermore, the detection points of the first group share a first geometrical object and the detection points of the second group share a second geometrical object. The second geometrical object is determined from a predefined map representing the vicinity of the vehicle, and the first geometrical object is determined independently from the predefined map. Preferably, the first geometrical object is also determined independently from other "models", e.g. models derived from other scans comprising current detection points or detection points from other time instances (future or past).

The predefined map can be derived from map data stored in a database which can be located, e.g. in the vehicle or in a central server connected with the vehicle. The map data preferably captures a desired driving area, for example all valid driving areas in a given country or a group of different countries. From this map data a predefined map can be determined, wherein the predefined map can be limited to a current vicinity of the vehicle. This current vicinity can be limited to a specified range of the sensor system so that the predefined map includes only those elements within the range, i.e., those objects which are potentially detected by the sensor system. Therefore, a step of determining the predefined map can comprise identifying a portion of the map which corresponds to a current "view" of the sensor system, thereby providing a geo-structural description of the local vicinity of the vehicle at a given time instant. The predefined map can be determined on the basis of a position information derived from a current GPS-signal received at the vehicle. If such a signal is currently not available the last GPS-signal or another inaccurate position estimation may be used.

Preferably, the first geometrical object is defined as an enclosure around a respective detection point, and wherein the enclosure is positioned such that the respective detection point is at least substantially centric in the enclosure. In particular, the enclosure has a circular or spherical shape. A circular shape may be sufficient if detection points are only processed with respect to their position in a plane, i.e. the ground beneath the vehicle. Also merely preferably, the enclosure, i.e. the shape of the enclosure is invariant, i.e. fixed for all detection points. This means that the same type of geometrical object can be positioned on each detection point, thereby simplifying the determination of the weights. The first geometrical object is a means to identify the first group, wherein the first group may represent a distribution of detection points around a detection point being associated with the geometrical object.

For a respective detection point, determining the second geometrical object can comprise identifying, from a plurality of elements of the predefined map, at least one respective element, wherein each of the plurality of elements of the predefined map represents a static landmark in the vicinity of the vehicle, and wherein the static landmark represented by the identified at least one respective element is associated with a maximum likelihood of being causal for the location represented by the respective detection point. The second group may be interpreted as a distribution of detection points associated with a respective element. The predefined map can be navigation map, in particular a navigation map from a publicly available database, e.g. open-street map. The predefined map can be derived from a global database on the basis of a given position of the vehicle, e.g. from a global position system of the vehicle, as indicated further above. The static landmarks can be static objects, e.g. walls of buildings or other barriers for the vehicle which form objects detectable by the sensor system of the vehicle. The elements of the map preferably have a mathematical or "modelled" nature so they can also be denoted as native elements, i.e. elements which are defined from scratch.

Identifying the at least one respective element can comprise assigning the element having a minimum distance to the detection point. In other words, the element located nearest to the detection point can be chosen as the associated element. This is appropriate because the detection point should have a physical basis, which ideally matches with the element identified. The distance metric used for identifying the nearest element can be the Euclidian distance between the point and the element. The distance metric can be calculated for all elements in the vicinity of a given detection point. The resulting distance metrics are then compared with each other, wherein the lowest value is chosen for identifying the nearest element. Although a given detection point can be associated with more than one element, each detection point is preferably associated with exactly one element, i.e. only the nearest element is assigned to the detection point.

According to another preferred embodiment, each of the plurality of elements of the predefined map comprises an extended geometrical object, in particular a line or a surface, preferably a straight line or a plane. In this way, nearly all static objects which appear in a predefined map can be described in a manner sufficient for the present application of identifying a physical basis for each detection point. For example, a line can be described by a simple parametric function, which requires only a low amount of storage resources (e.g., f(x)=ax+b). Therefore, a memory for storing the map material (for determining the predefined map) in the vehicle can be relatively small. It is also understood that a line is not necessarily straight but can also comprise curved sections.

According to a further embodiment evaluating the weight for a given detection point $p_i$ (with i=1, 2, . . . , m) comprises multiplying the first weighting factor and the second weighting factor, wherein the first weighting factor is defined as $$w_1 = e^{-\left(\gamma\left(\frac{M_p - |G_{p_i}|}{M_p}\right)\right)},$$

wherein $M_p$ is a maximum quantity with respect to the first group associated with the given detection point $p_i$, $|G_{p_i}|$ is the quantity of the first group, and $\gamma$ is a free parameter, wherein the second weighting factor is defined as $$w_2 = e^{-\left(\sigma\left(\frac{M_{map} - |N_r|}{M_{map}}\right)\right)},$$

wherein $M_{map}$ is the maximum quantity with respect to the second group associated with the given detection point $p_i$, $|N_r|$ is the quantity of the second group, and $\sigma$ is a free parameter. The parameters $\gamma$ and $\sigma$ influence how quickly the respective exponential function e decays. As the skilled person understands, both weighting factors are limited to the range (0, 1] and are thus expressed on a predefined scale. Subtracting the determined quantities $|G_{p_i}|$, $|N_r|$ from the maximum quantities $M_p$, $M_{map}$ and dividing by $M_p$ and $M_{map}$ in the exponential terms of the first and second weighting factors, respectively, is one way of normalizing the determined quantities to the maximum quantity. As the skilled person understands the above expressions of the weighting factors are only one exemplary formulation and other, i.e. derived expressions may be used to achieve the same desired weighting behaviour. An inverse representation of the weight can be given by inverting the two weighting factors; that is to change the minus signs of the exponential terms into plus signs.

According to another preferred embodiment the method further comprises determining, by means of a prefiltering of the plurality of detection points, the subset of the plurality of detection points, wherein the prefiltering comprises, for each detection point of the plurality of detection points, identifying, from the plurality of elements of the predefined map, an element having a minimum distance to the detection point, and assigning the detection point to the subset of the plurality of detection points if the distance is below a predefined threshold. In other words, a given detection point will only then be part of the subset if the nearest element is not too far away. One could also say that the subset of detection points is determined on the basis of the distance between each detection point of the plurality of (raw) detection points and the nearest element of the predefined map, wherein the subset of detection points is formed by the detection points having a distance to the nearest element below a threshold. This approach can be regarded as a plausibility constraint because the true location of the physical basis of the detection point should not be too far away from the evaluated location it represents. Otherwise, the detection point is preferably discarded for the determination of the position of the vehicle. In order to save computational time, no weight is computed for these "far-off" detection points. This can be interpreted as a simplified weighting with zero, wherein these detection points are assumed to form extreme outliers with no validity and should thus have no influence on the determined position.

As an alternative to the prefiltering described above or additionally, the method can further comprise determining, by means of a prefiltering of the plurality of detection points, the subset of the plurality of detection points, wherein the prefiltering comprises, for each detection point of the plurality of detection points, (i) identifying, from the plurality of elements of the predefined map, an element having a minimum distance to the detection point, (ii) assigning the detection point to the identified element, (iii) assigning the detection point to the subset of the plurality of detection points if the distance between the detection point and a complementary element is below a second predefined threshold, wherein the complementary element is evaluated on the basis of the detection points being assigned to the identified element, wherein the number of detection points being assigned to the identified element and to the complementary element is maximized. The complementary element is preferably a straight line which is evaluated by means of simple linear regression on the basis of a set of randomly chosen detections points which are assigned to a respective element of the predefined map. Preferably, the set of randomly chosen detection points is only a portion of the overall number of detection points assigned to the identified element. The step of randomly chosen detection points can be repeated a number of times. Afterwards, the set which leads to the maximum number of detection points being assigned to both the identified element (of the predefined map) and the complementary element (for the respective random set) is chosen as the subset of detection points "surviving" the prefiltering. The general approach is sometimes also referred to as random sample consensus (RANSAC) filtering and has been found to work particularly well in combination with the proposed weighting of detection points. The term prefiltering is used to indicate that the filtering is carried out before the weighting step, wherein the latter can also be interpreted as a filtering with respect to the detection points.

The invention further relates to a vehicle with a radio-based and/or an optical sensor system, wherein the vehicle comprises a processing unit configured to carry out the method according to at least one of the preceding embodiments. The processing unit can be connected to a memory in which program code representing the method is stored. Preferably, the method can be carried out without a mobile connection to a central server or the like. Therefore, the memory can also comprise a database including data for determining a predefined map representing the vicinity of the vehicle. However, as the skilled person understands, use of a mobile connection can be made for updating or incorporating data while carrying out the method. Preferably, the processing unit is further configured to determine the position of the vehicle on the basis of the subset of the plurality of detection points, wherein each of the plurality of detection points of the subset is processed with respect to the weight. This is to say that the position is determined only on the basis of those detection points for which a weight has been evaluated. However, it is of course possible to make use of other detection points.

According to another embodiment, the method can comprise a matching at least a plurality of detection points and at least one element of the predefined map. The matching can comprise determining a rigid transformation function (also denoted as rigid body transformation function) by minimizing distances between transformed detection points and the elements assigned to the plurality of detection points, wherein the transformed detection points represent the subset of the plurality of detection points transformed by means of the rigid transformation function. Preferably, the rigid transformation function is determined by minimizing the sum of the Euclidian distances between each transformed detection point and the assigned element. In particular, determining the rigid transformation function can comprise minimizing the expression $$F(P,R,t) = \sum_{i=1}^{m}[n_i^T(Rp_i+t)-b_i]^2,$$

wherein
P represents the subset of m detection points,
R represents a rotation,
t represents a translation,
$p_i$ represents the i-th detection point of P,
$b_i$ represents the orthogonal distance to the element assigned to the i-th detection point of P,
$n_i^T$ represents the transpose of a normal vector with respect to the element assigned to the i-th detection point of P.

The rigid transformation function can be interpreted as a transformation of the coordinate system used for describing (the locations of) the detection points. This is that all detection points are transformed in the same way. In this regard, the error function F represents the sum of the squared Euclidian (i.e., orthogonal) distances between the transformed detection points and the assigned elements. Each detection point $p_i$ and corresponding normal vector $n_i^T$ is preferably formed by a two-dimensional vector, respectively (vector with respect to the origin of the coordinate system). The distance $b_i$ is preferably a scalar giving the distance between the origin of the coordinate system and the respective element. The rigid transformation function is one way to describe the correspondence between the elements of the predefined map and the detection points. For example, the rigid transformation function can be applied to the plurality of detection points, thereby "correcting" the detection points. However, the rigid transformation function can also be applied to other position measurements of the vehicle.

Determining the rigid transformation function can involve a probabilistic model, wherein at least one parameter of the probabilistic model represents an expected variance of at least a respective one of the plurality of detection points, wherein the expected variance is non-constant. The probabilistic model can be of the type of a so-called Gauss-Helmert-Model, which is described in greater detail, e.g., in "K.-R. Koch: Parameterschaetzung und Hypothesentests in linearen Modellen. Ehemals Ferd. Diimmlers Verlag, Bonn, 2004". The probabilistic model can be the Gauss-Helmert-Model described therein. It is understood that this model can be used in the context of the applications described herein.

As an example of minimizing the above error function F, consider again the m detection points, each having coordinates in directions x and y:

$$p(p_1 p_2 \ldots p_m)^T \in \mathbb{R}^{m \times 1}, p_i = (p_{ix}, p_{iy})^T.$$

A rotation and a translation can be described by:

$$R(\Phi) = \begin{pmatrix} \cos(\Phi) & -\sin(\Phi) \\ \sin(\Phi) & \cos(\Phi) \end{pmatrix}, t = \begin{pmatrix} t_x \\ t_y \end{pmatrix}.$$

For linearizing the error function F, a Taylor series expansion can be adopted with split-ups of the detection points and the optimum parameter $D^* = [t_x^*, t_y^*, \Phi^*]^T$.

$$\tilde{p} = p + \mathcal{V} = \underbrace{p - p_0}_{\Delta p} + p_0 + \mathcal{V} = p_0 + \Delta p + \mathcal{V}$$

$$\tilde{D}^* = D_0^* + \Delta D^*,$$

wherein $$z_0 = [D_0^*, p_0]^T$$

is the Taylor point and V is an improvement term. The minimization of F as can be solved as $$F(\tilde{p}, \tilde{D}^*) = \underbrace{F(p, D^*)|_{p=p_0, D^*=D_0^*}}_{w_0} + \underbrace{\nabla_p F(p, D^*)|_{p=p_0, D^*=D_0^*}}_{\bar{B}_{GHM}^T}$$

$$(\Delta p + \mathcal{V}) + \underbrace{\nabla_x^* F(p, D^*)|_{p=p_0, D^*=D_0^*} \Delta D^*}_{A}$$

$$= \underbrace{w_0 + \bar{B}_{GHM}^T \Delta p}_{w} + \bar{B}_{GHM}^T \mathcal{V} + A\Delta D^* = 0$$

which can be simplified by Lagrangians to $$\begin{pmatrix} \bar{B}_{GHM}^T \Sigma \bar{B}_{GHM} & A \\ A^T & 0 \end{pmatrix} \cdot \begin{pmatrix} \bar{k}_{GHM} \\ \Delta D^* \end{pmatrix} = \begin{pmatrix} -w \\ 0 \end{pmatrix},$$

wherein the detection points have individual covariance matrices written as

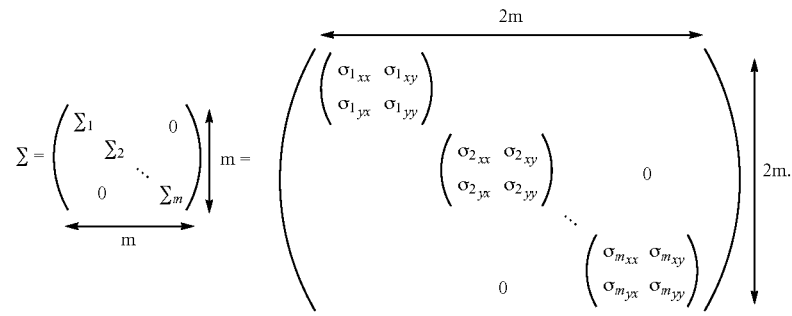

This "global covariance matrix" for all detections, e.g. of one or more scans, can be weighted element-wise with weights $$W_i, i=1,\ldots,m,$$

$$\tilde{\Sigma}_i = \Sigma_i \cdot W_i,$$

wherein each entry of each covariance matrix is multiplied with the weight that is individual for the corresponding detection point. In this way, the rigid transformation function gains a greater accuracy, wherein application of the transformation to an inaccurate position estimation leads to a corrected position which is more reliable.

The method can further comprise determining, from a motion model of the vehicle, a preliminary position of the vehicle, wherein determining the position of the vehicle comprises transforming the preliminary position by means of the rigid transformation function. The motion model can be a model which describes the trajectory of the vehicle over time. The model can be initialized with some value and is then periodically updated based on motion measurements of the vehicle. In this regard, the motion model is preferably determined on the basis of at least one measurement from at least one motion sensor of the vehicle and/or on the basis of at least some of the plurality of detection points. The combination of measurements from a motion sensor and a sensor system can further enhance the accuracy of the method.

The measurement from the at least one motion sensor can comprise a velocity and/or a yaw rate of the vehicle, wherein the vehicle preferably comprises corresponding sensor facilities. This is also known as "dead-reckoning" measurements. Preferably, the velocity and/or the yaw rate of the vehicle is determined on the basis of wheel-speed-sensor (wheel rotation per time span) measurements and/or yaw-rate-sensor measurements, and/or on the basis of the detection points.

Dead-reckoning measurements taken alone have been found to provide inaccurate estimations of the vehicle position under certain conditions, e.g., during strong steering maneuvres. For this reason, the estimation based on dead-reckoning can represent a preliminary estimation of the vehicle's position. The rigid transformation function can be applied to the preliminary position in order to arrive at a final position which has greater accuracy than the preliminary position:

$$\underbrace{\begin{pmatrix} x_{sm} \\ y_{sm} \\ \theta_{sm} \end{pmatrix}}_{P_{sm}} = \begin{pmatrix} \cos(\Phi) & -\sin(\Phi) & 0 \\ \sin(\Phi) & \cos(\Phi) & 0 \\ 0 & 0 & 1 \end{pmatrix} \cdot \underbrace{\begin{pmatrix} x_{dr} \\ y_{dr} \\ \theta_{dr} \end{pmatrix}}_{P_{dr}} + \begin{pmatrix} t_x \\ t_y \\ \Phi \end{pmatrix},$$

wherein
$P_{dr}$
is the preliminary, i.e. inaccurate position of the vehicle and
$P_{sm}$
is the corrected position which may be denoted as "scan-matching position", and
wherein the rigid transformation function is determined by the optimized parameter vector $$D=(t_x, t_y, \Phi)^T.$$

According to another embodiment, the subset or all of the plurality of detection points used for matching includes detection points from a plurality of successive scans of the sensor system, in particular 1 to 20 scans, preferably 10 scans, wherein the scan rate is between 10 to 40 Hz, preferably 20 Hz.

In one embodiment, the method can be implemented in a vehicle in order to provide one or more autonomous-driving applications requiring accurate information about a current position of the vehicle. One such application is valet parking in a parking level, wherein the vehicle automatically drives into a desired parking space without requiring motor and steering control of the driver. This is to say that the driving behaviour of the vehicle is controlled or modified with respect to the determined position of the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention is described further in the following by means of exemplary embodiments shown in the drawings in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In the figures, the same or corresponding elements are indicated with the same reference signs.

Figure 1:
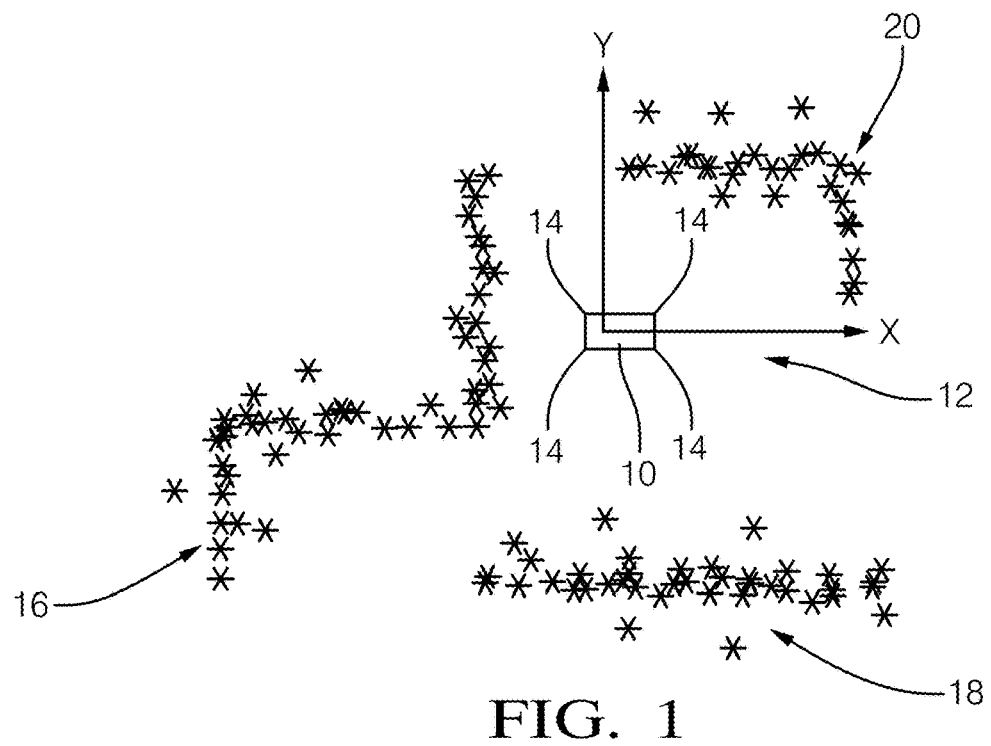
FIG. 1 is a schematic illustration of a vehicle and a plurality of detection points in a vehicle coordinate system.
Figure 2:
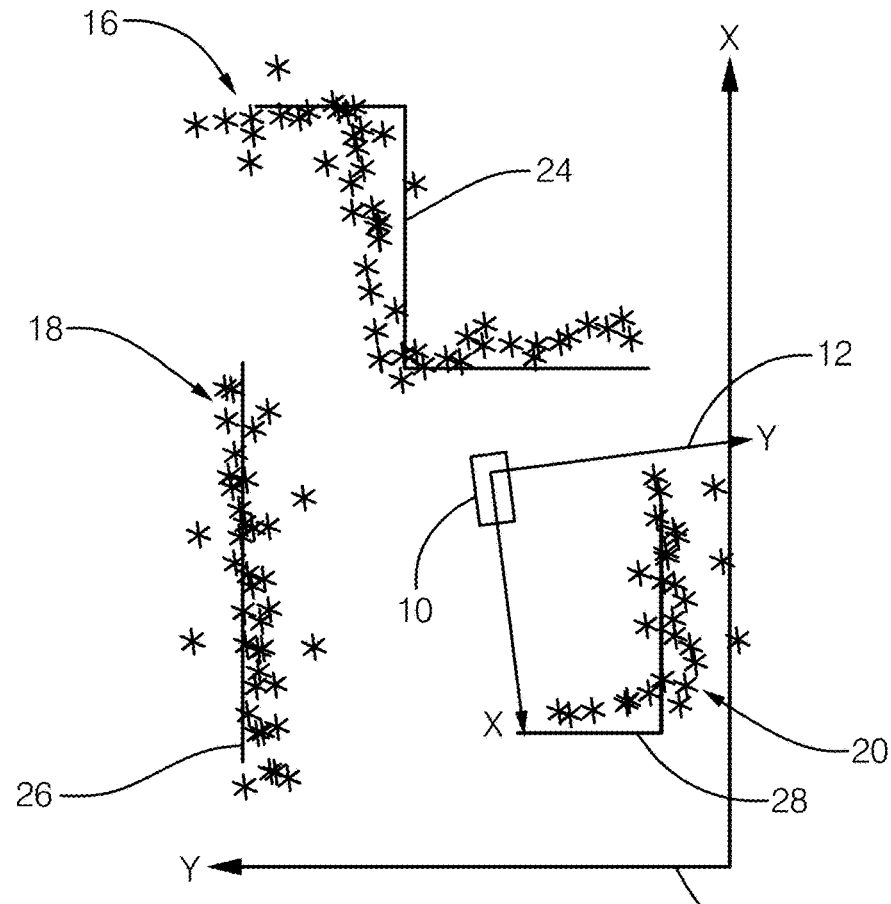
FIG. 2 is the schematic illustration of FIG. 1 transformed into a world coordinate system and additionally showing a plurality of elements of a predefined map.
Figure 3:
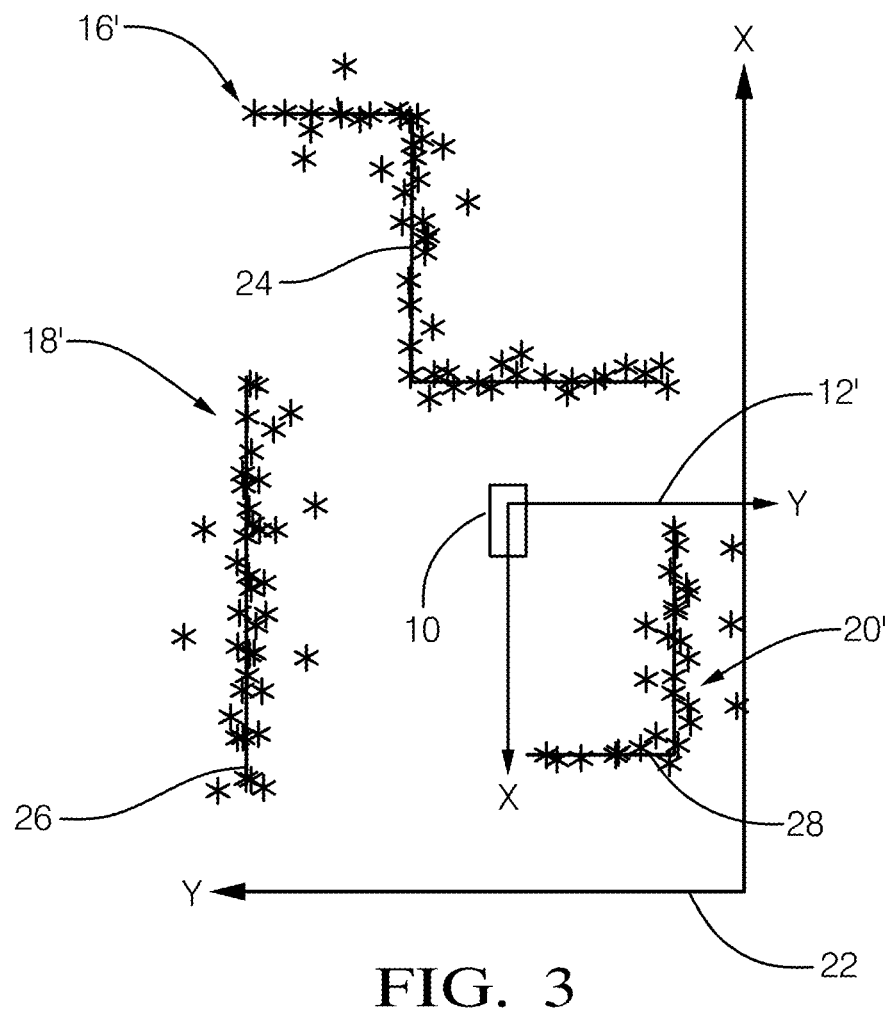
FIG. 3 is the schematic illustration of FIG. 2, wherein the vehicle and the detection points are transformed by means of a rigid body transformation function.

FIGS. 1 to 3 provide a basic illustration of a matching procedure in the context of the methods described herein. In FIG. 1, a schematic of a vehicle 10 is positioned in the origin of a coordinate system 12 of the vehicle 10. The vehicle coordinate system 12 is indicated as a Cartesian coordinate system with axes x and y in orthogonal relation to each other, wherein the vehicle's heading is aligned with the x-axis of the coordinate system 12.

The vehicle 10 has a radar system comprising a total of four pairs 14 of radar sensors and radar emitters, which are positioned in each of the corners of the vehicle 10. Therefore, the vehicle 10 is configured to "look" within an angle range of 360 degrees around the vicinity of the vehicle 10. It is understood that the vehicle 10 can have a different number of radar sensors and emitters which also can be positioned in a different configuration than shown in FIG. 1.

In FIG. 1, a plurality of detection points are arranged in groups 16, 18, and 20 around the vehicle 10, wherein each detection point is indicated with a star and illustrates a location in the vicinity of the vehicle 10. The detection points are acquired by means of the radar system in one or more scans.

FIG. 2 corresponds to FIG. 1, wherein the vehicle 10 and the vehicle coordinate system 12 are shown with respect to a world coordinate system 22 which is also a Cartesian coordinate system with axes x and y and which can be a coordinate system of the predefined map. However, the detection points 16, 18, 20 are shown with respect to the vehicle coordinate system 12. Additionally, FIG. 2 shows a plurality of elements 24, 26, and 28 with respect to the world coordinate system 22. These elements 24, 26, 28 represent static landmarks in the vicinity of the vehicle 10. In particular, the elements 24, 26, 28 represent walls of a building or groups of walls. The elements 24 and 28 for example comprise different sub-elements, each of the sub-elements formed by a straight line in orthogonal relation to an adjacent line. Each straight line may be handled separately as a single element, as will be explained further. It is understood that the elements 24, 26, 28 may form a predefined map with regard to the vehicle 10 and that the elements 24, 26, 28 are computer-implemented representations of real static landmarks, i.e. objects. In the examples throughout the figures, the static landmarks represented by the elements are formed by grid-like fences. This means that, e.g., radar signals, may be partially reflected and partially passing through the fences leading to a plurality of detection points located in substantially different distances from the sensor system, e.g., in front, on, or behind a respective element (cf., e.g., FIG. 5, detection point 48 relative to vehicle 10 and the element 43 in between). This is a particularly challenging application scenario which shows the merits of the invention well.

As can readily be seen from FIG. 2, the elements 24, 26, 28 show a geometrical correspondence with the groups of detection points 16, 18, and 20. In fact, it can be assumed that the elements 24, 26, 28 are causal for the groups of detection points 24, 26, 28, respectively. However, there is an angular displacement between the elements 24, 26, 28 and the detection points 16, 18, 20. This displacement corresponds with an inaccurate position of the vehicle 10 with respect to the world coordinate system 22. This inaccurate position can be denoted as a preliminary position estimated on the basis of, e.g., motion sensors of the vehicle 10 ("dead reckoning"), and a motion model can be used for estimating the preliminary position (also denoted as preliminary ego-pose).

Having regard to compensating the mentioned angular displacement, a matching procedure comprises first to evaluate the correspondence, i.e. the relationship between the elements 24, 26, 28 and the detection points 16, 18, 20. This is to find a transformation function which can be used to correct the inaccurate position. This transformation function can be a rigid transformation function including a translation and a rotation. This is to say that there can also be a translational displacement and not only an angular displacement between the detection points 16, 18, 20 and the elements 24, 26, 28 as shown in FIG. 2. The step of actually compensating, i.e. correcting the preliminary position by means of the evaluated transformation function can be the second step of the matching procedure. A corresponding result is illustrated in FIG. 3, in which the inaccurate position of the vehicle 10 from FIG. 2 has been corrected by means of transforming the vehicle coordinate system 12 with respect to the rigid transformation function (cf. vehicle coordinate system 12'). Accordingly, the transformed detection points 16', 18', 20' now approximately match with the elements 24, 26, 28.

Figure 4:
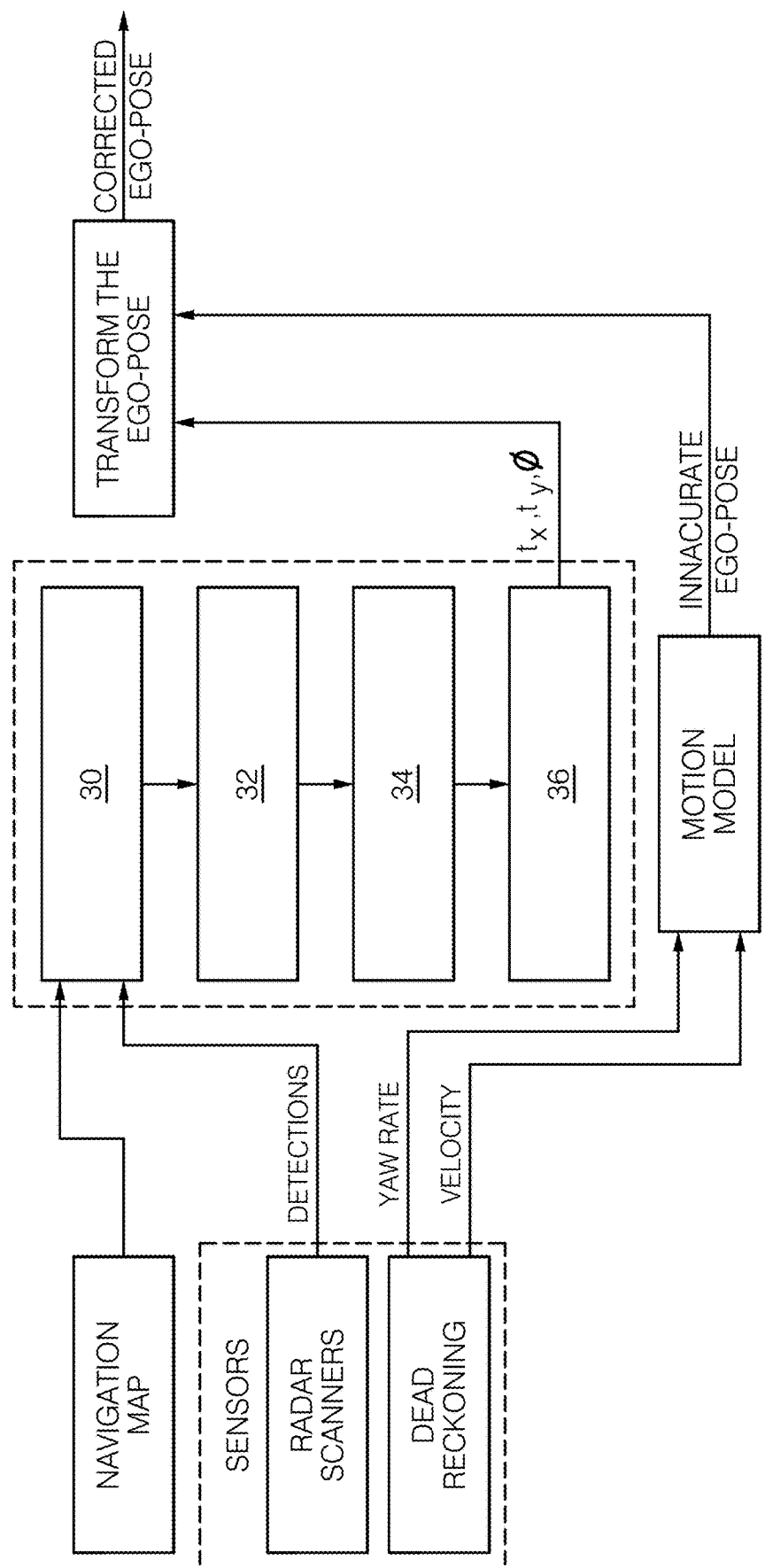
FIG. 4 is a schematic overview illustrating a method for determining the position of a vehicle equipped with a radar system and motion sensors.

FIG. 4 gives a schematic overview of a particular matching procedure as introduced above. The term "navigation map" refers to a plurality of elements stored in a database, wherein a selection of elements within a range of the radar system ("radar scanners") can form a predefined map which is fed into a processing block 30. This block 30 also receives a plurality of detection points ("detections") acquired by means of the radar system. In block 30, the nearest element is identified for each detection point. In block 32, an assignment to the nearest element is carried out if one or more conditions are fulfilled. One condition is that the distance to the nearest element has to be below a predefined threshold. This is further illustrated in FIG. 5 which schematically shows a parking level 38 comprising a plurality of elements indicated as lines, e.g. the elements 40 and 42. The parking level 38 also comprises a plurality of parking spaces 44. These parking spaces 44 are preferably not coded by elements of the predefined map since they are not static landmarks in the sense of obstacles. The vehicle 10 has acquired a plurality of raw detection points 46 which form a cloud of detection points. Only a portion of the raw detection points 46 are assigned to the respective nearest element, namely the detection points 48 indicated as stars. These detection points 48 all have a distance to the nearest element below a threshold. These detection points 48 are assigned to the nearest element and form a subset of the raw detection points 46 used for further processing.

Figure 6:
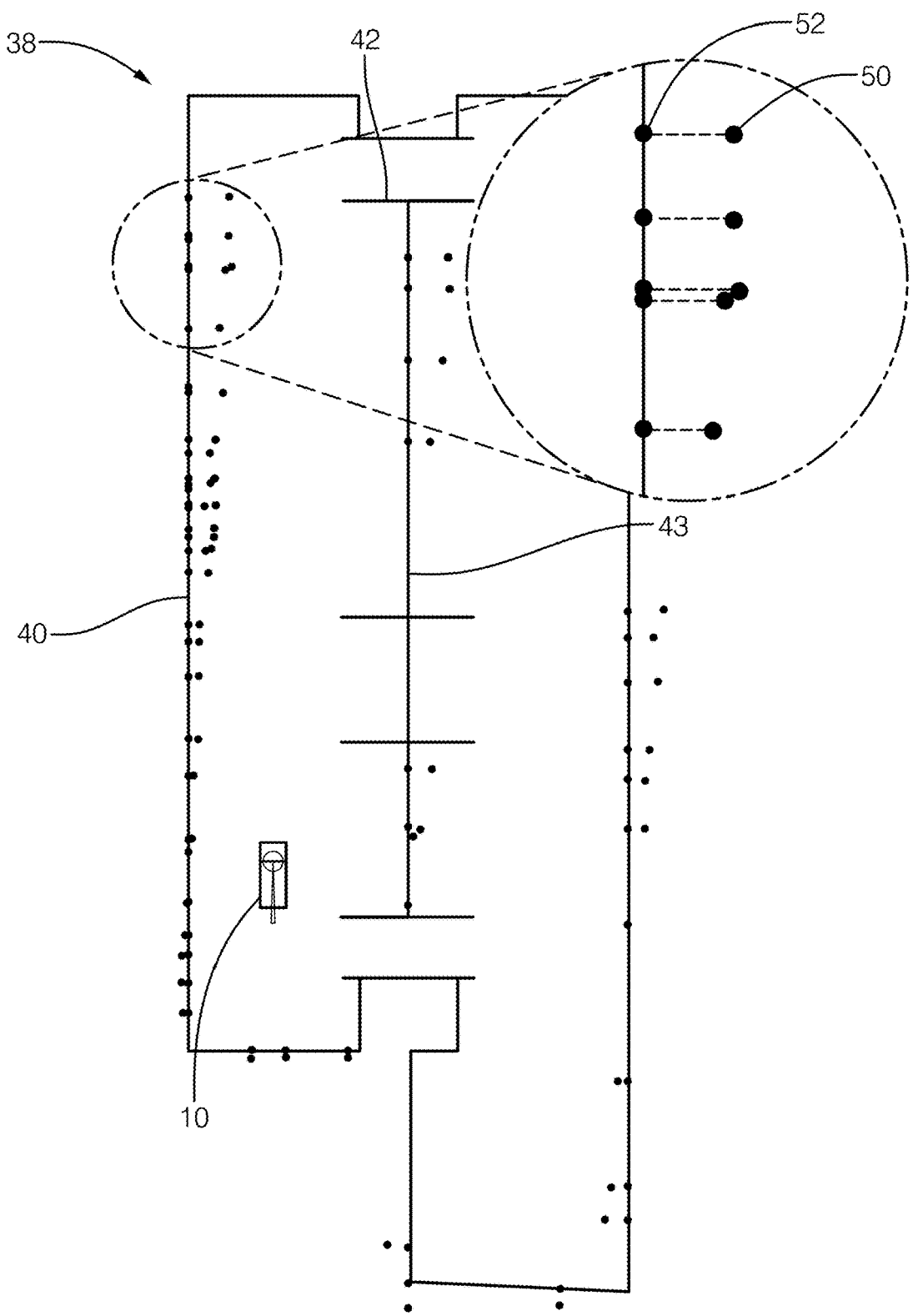
FIG. 6 is a schematic illustration of a predefined map representing a parking level, wherein the illustration further comprises a vehicle and a plurality of detection points acquired by means of a radar system of the vehicle, wherein an orthogonal projection of the detection points onto the nearest element of the predefined map is illustrated.

FIG. 6 illustrates how the distance between a detection point 50 and the nearest element 40 can be evaluated. In a mathematical sense, each detection point 50 can be orthogonally projected onto the nearest element 40, which gives an orthogonal projection 52. The distance between these two points is indicated as a dashed line the length of which is the Euclidean distance.

Figure 7:
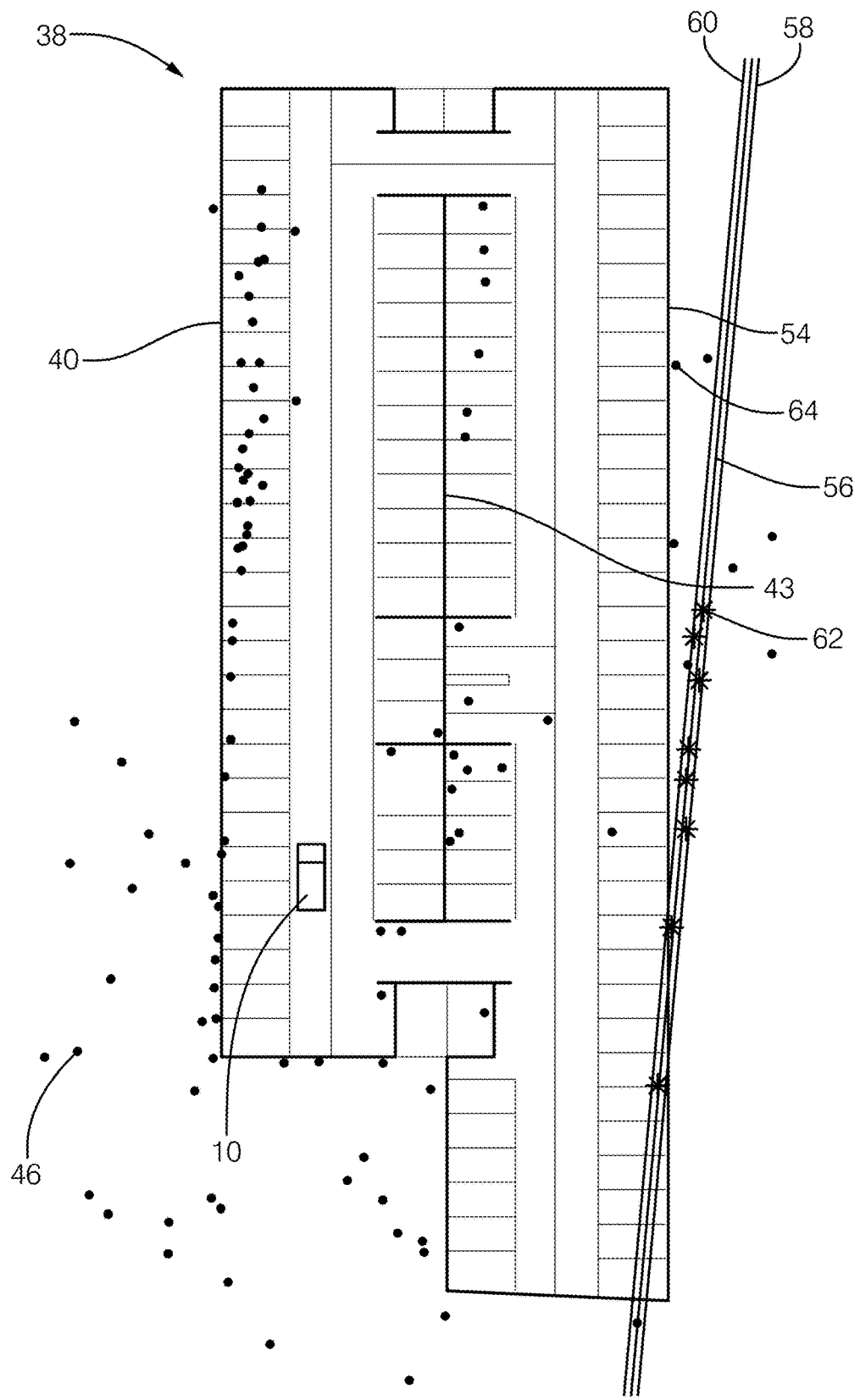
FIG. 7 illustrates a prefiltering of detection points for a portion of detection points assigned to the right most element of the predefined map.

As an alternative to assigning detection points to the nearest element if the distance between them is below a threshold (cf. block 32 in FIG. 4), it is also possible to allow an assignment if the distance between the respective detection point and a complementary element 56 (cf. FIG. 7) is below a threshold. In FIG. 7, this complementary element 56 is a regression line evaluated on the basis of those detection points which are nearest to the element 54, e.g., the detection points 64, 62 in FIG. 7. For each of those detection points it is checked whether the distance to the complementary element 56 is below a threshold. This is equivalent to checking whether the position of the detection point is within a band between a first boundary 58 and a second boundary 60 with respect to the complementary element 56. If the detection point is within this band, the detection point is assigned to the element 54. In FIG. 7, this is the case for the detection points 62 indicated as asterisks.

Figure 8:
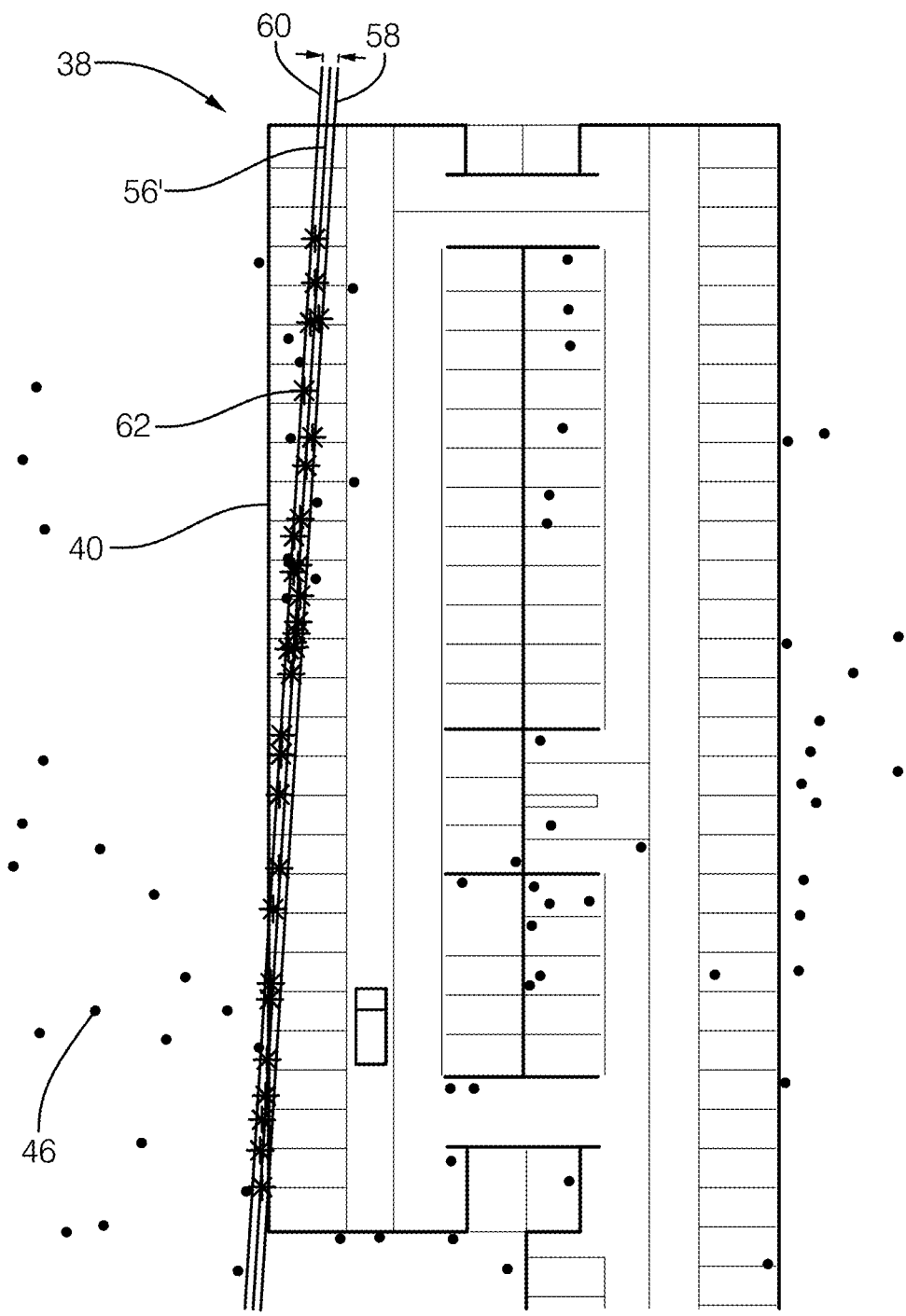
FIG. 8 illustrates a prefiltering of detection points for a portion of detection points assigned to the left most element of the predefined map.
Figure 9:
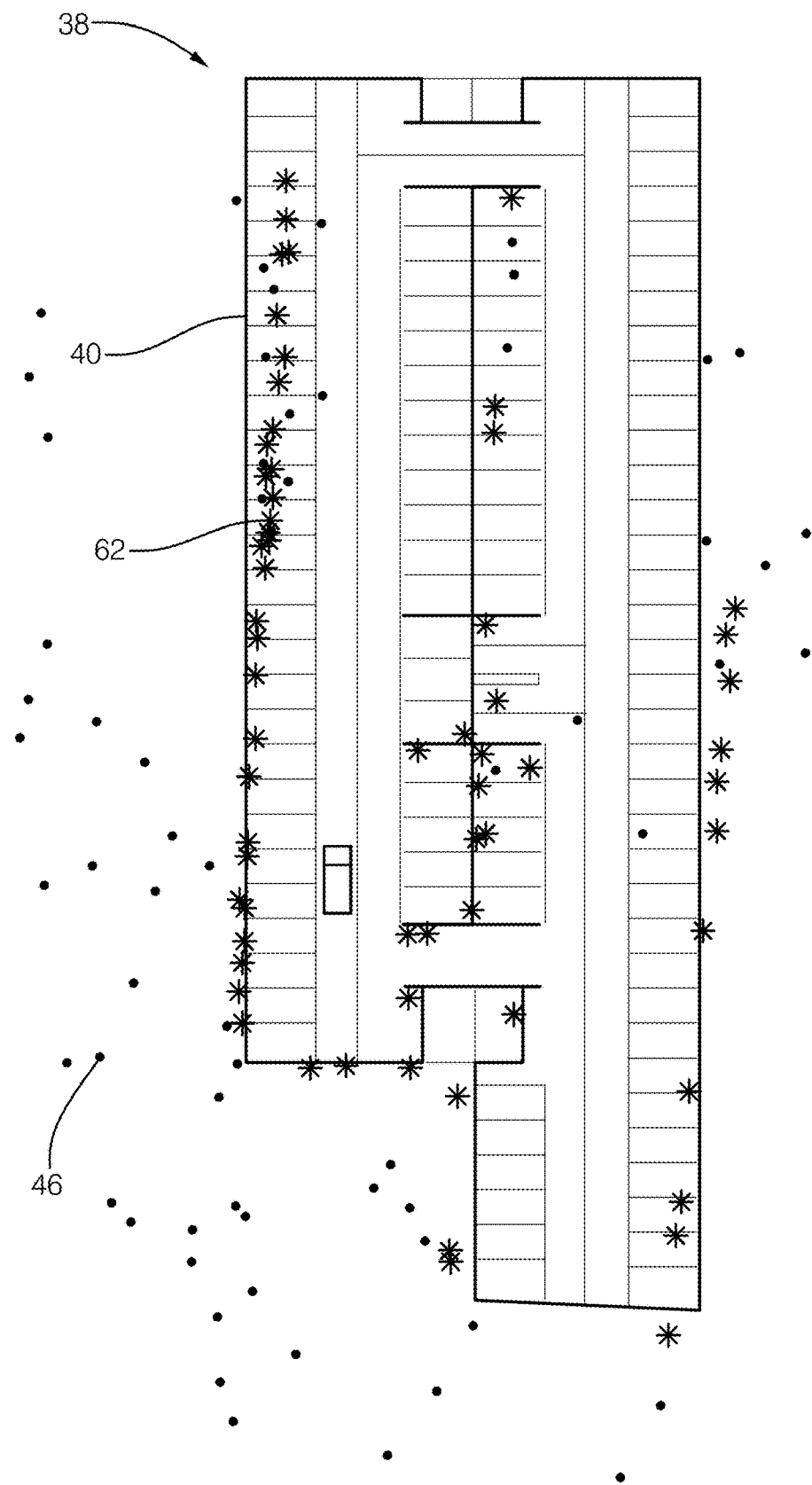
FIG. 9 illustrates a prefiltering of detection points for a plurality of detection points assigned to nearest elements of the predefined map, respectively.

FIG. 8 illustrates a situation similar to the one of FIG. 7, wherein a complementary element 56' is evaluated for the detection points being nearest to the element 40, e.g., the detection points 62, 46. Eventually, this procedure is carried out for all detection points. The result is shown in FIG. 9, wherein the detection points 62 indicated as asterisks form the filtered subset outputted from block 32 for further processing in block 34 (cf. FIG. 4).

Figure 10:
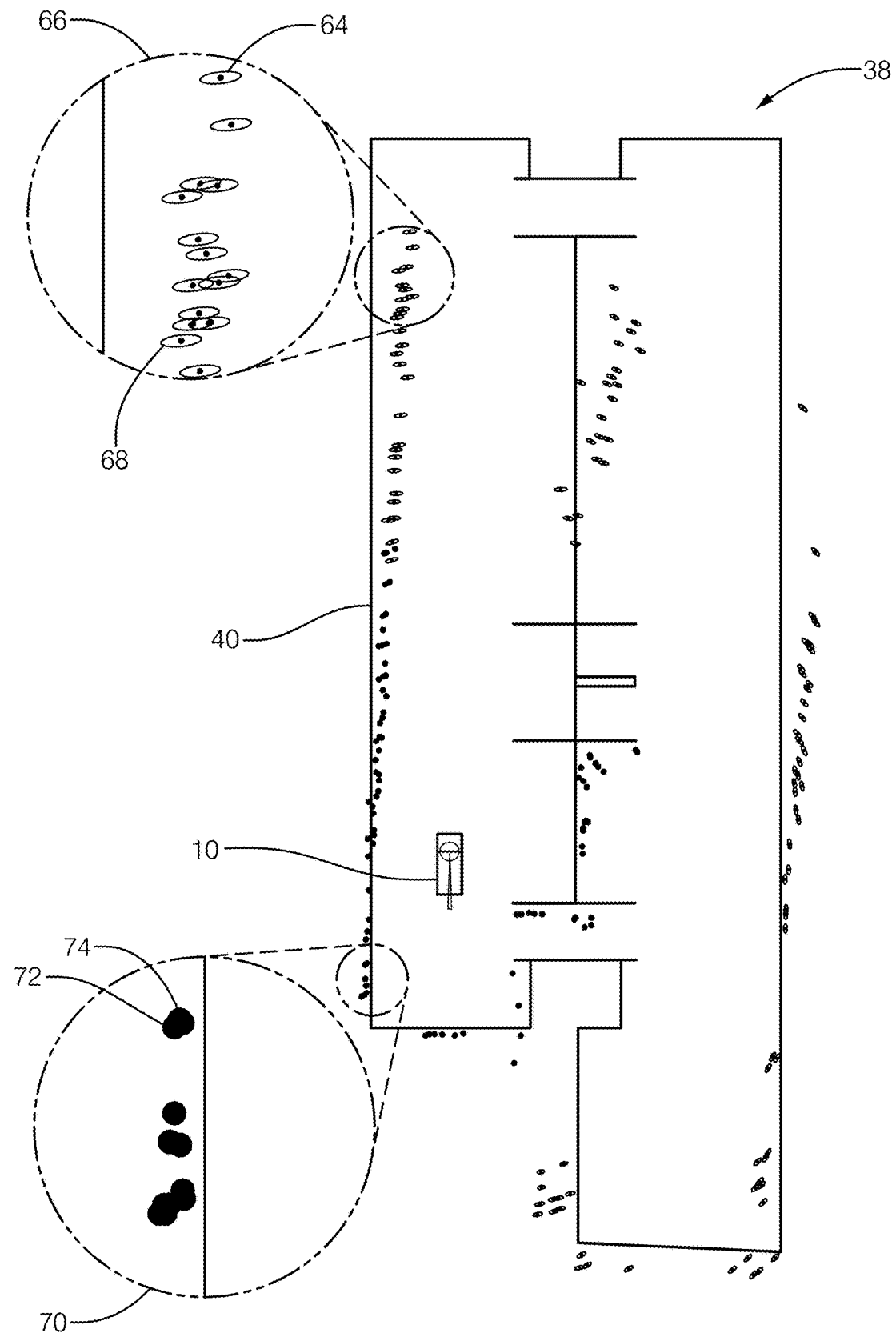
FIG. 10 illustrates an uncertainty associated with detection points.

Further processing of the filtered detection points 62 may comprise evaluating weights for the detection points according to their assumed uncertainty. This corresponds to block 34 of FIG. 4. A priori, each detection point is assumed to possess a certain, i.e. predefined measurement uncertainty which can be geometrically interpreted as an "area" around each detection point within which the true location represented by the detection point is assumed to be with high probability (i.e., the measurement uncertainty is modelled by a probability density function). This is effectively a probabilistic definition of the detection point, which may be represented as an individual covariance matrix for each detection point. This probabilistic approach is illustrated in FIG. 10 comprising two enlarged areas 66 and 70 adjacent to the element 40. In the enlarged area 66, an ellipse 68 is positioned around each of the detection points 64, thereby indicating an individual area of uncertainty associated with the respective detection point 64. Each of the ellipses 68 may be described by means of a covariance matrix. The uncertainty represented by the ellipses 68 may be parametric with respect to a measurement distance between the detection point and the radar sensor of the vehicle. Therefore, the uncertainty, i.e. the major axes of ellipses 68 may increase with the distance between the detection point and the associated radar sensor. This can be seen by comparing the ellipses 68 in the area 66 with the ellipses 72 for the detection points 74 in the enlarged area 70. In the latter case, the major axes of the ellipses 72 are much smaller due to the lower distance to the vehicle 10. The elliptic shape of the uncertainty is due to the fact that the uncertainty with respect to the distance ("first component") is lower than the uncertainty with respect to an angle about the line of sight between the detection point and the associated sensor ("second component").

Figure 11A:
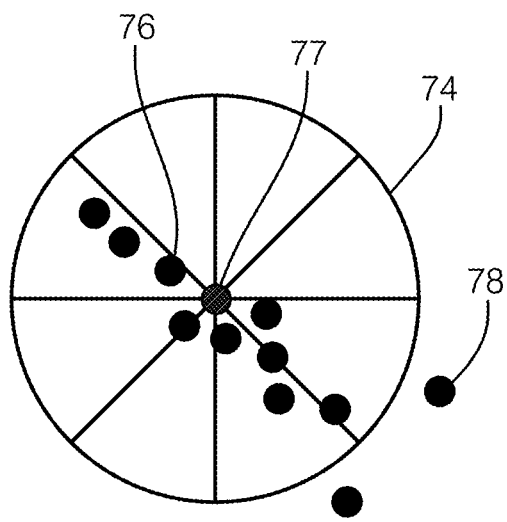
FIG. 11a illustrates a plurality of detections points and a circle centred with respect to one of the detection points, wherein the portion of detection points inside the circle form a group of detection points.
Figure 11B:
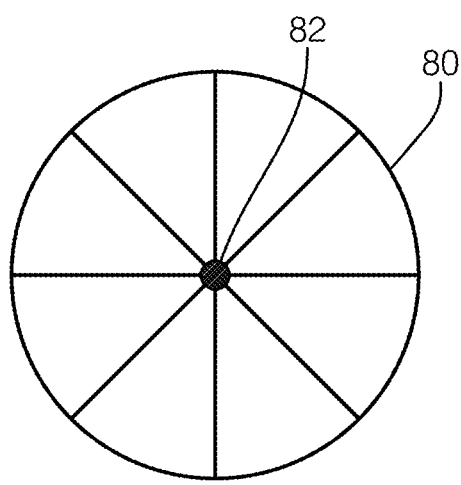
FIG. 11b illustrates a circle centred with respect to one detection point, wherein no other detection points are inside the circle.

From the perspective of measurement accuracy, usually not all detection points will have an equal accuracy, i.e. some detection points are more noisy than others. In this context, weights can be evaluated which represent an assumed degree of noisiness, i.e. uncertainty, for each detection point. These weights can then be used to modify a predefined uncertainty for each detection point in an individual way, as has been described further above. For a given detection point, a first weighting factor can be evaluated as illustrated in FIG. 11a. A circle 74, i.e. a first geometrical object is positioned centric around a given detection point 77. A quantity of detection points 76 sharing the circle 74 is determined by counting the number of detection points 76 within the circle 74. In FIG. 11a, the quantity is 9 (excluding the centric detection point 77). The detection points 78 outside the circle 74 have no influence on the quantity. In a comparison, the quantity associated with a detection point 82 in FIG. 11b is zero because apart from the detection point 82 no other detection points are inside a circle 80 around the detection point 82. Therefore, the given detection point 77 of FIG. 11a has a larger weighting factor than the given detection point 82 of FIG. 11b because the given detection point 77 is considered to be less noisy due to the higher number of adjacent detection points. As the skilled person understands, it is also possible to add the given detections 77, 82 to the respective quantities.

Figure 5:
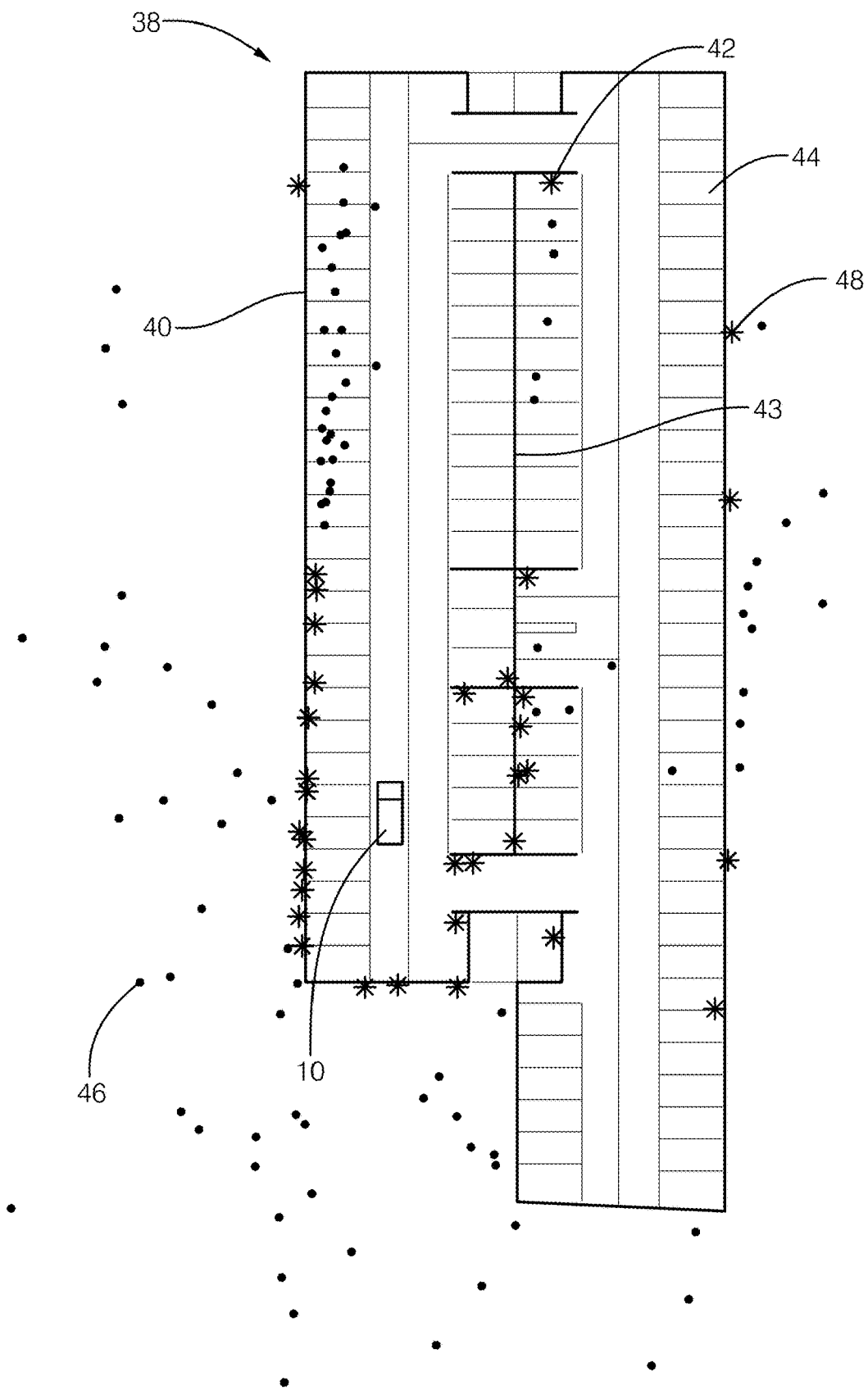
FIG. 5 is a schematic illustration of a predefined map representing a parking level, wherein the illustration further comprises a vehicle and a plurality of detection points acquired by means of a radar system of the vehicle.

A second weighting factor can be evaluated by counting the number of detection points which are assigned to a respective element. This is to say that the elements of the predefined map, such as the elements 40 and 43 in FIG. 5 are treated as second geometrical objects, wherein each detection point assigned to a respective element has a second weighting factor corresponding to the number of detection points which are assigned to the same respective element. Therefore, if many detection points are assigned to a single element then all of these detection points have a comparably large second weighting factor.

Figure 12:
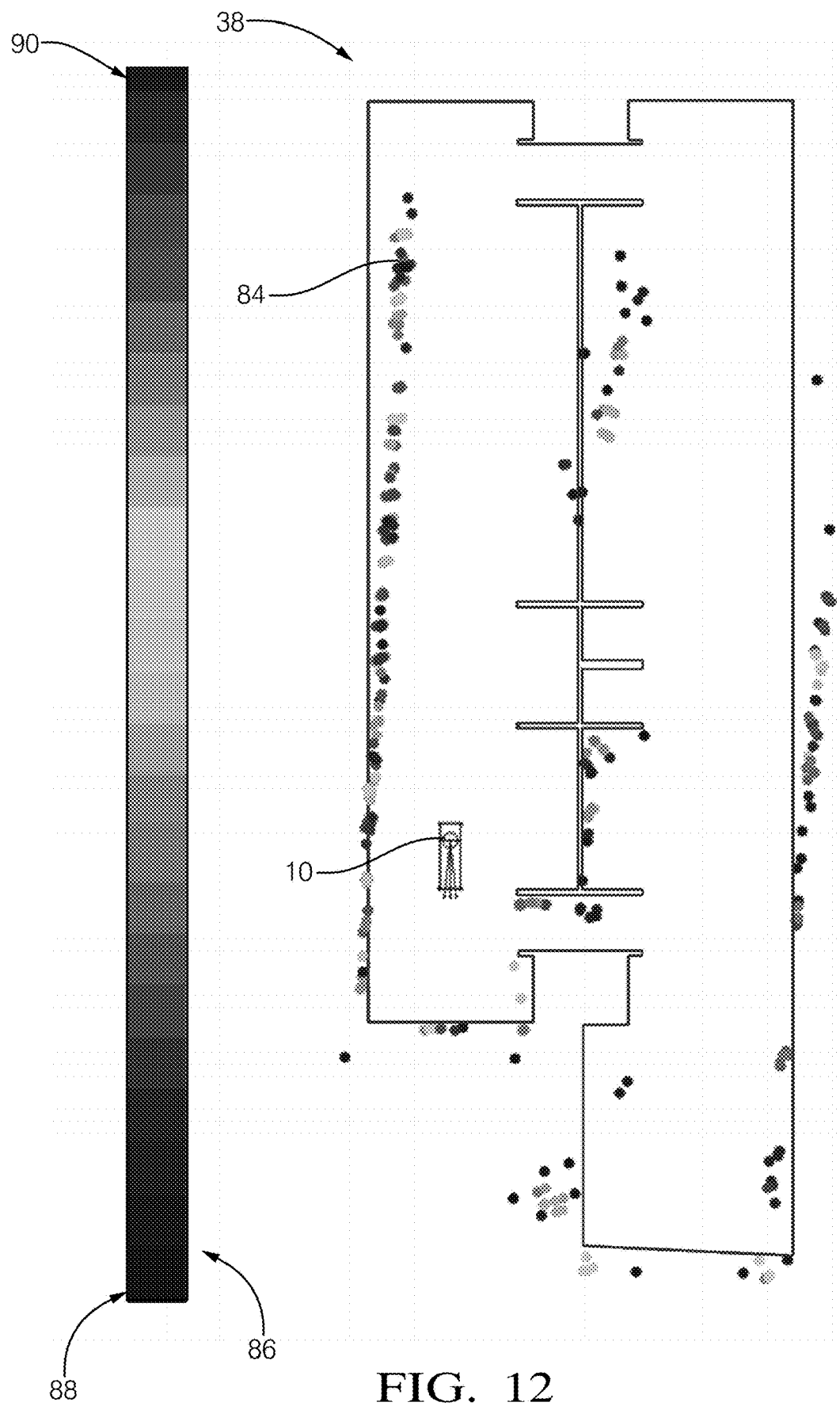
FIG. 12 illustrates evaluated weights for a plurality of detection points.

As described in detail further above, the first and second weighting factors can be multiplied. The resulting weights are illustrated in FIG. 12 by coding the weights by means of visual intensity. As shown by means of an intensity bar 86, the intensity values are between a minimum value 88 and a maximum value 90. The weights can be applied to the corresponding detection points by multiplying the inverse weights with the corresponding covariance matrices of the probabilistic model, as described in greater detail further above. The first and second weighting factors can also be combined in another way as multiplication or they can be used separately from each other.

Turning back to FIG. 4, the application of the weights can be carried out within the scope of block 36, which refers to determining a rigid (body) transformation function for correcting the inaccurate ego-pose of the vehicle 10. The rigid body transformation can comprise parameters $t_x$ and $t_y$ (translation) and parameter $\phi$ (rotation). These parameters can be found by minimizing the distances between the subset of detection points and the assigned elements. Transforming the inaccurate position with these parameters then gives the corrected position of the vehicle 10, which may be used for a wide range of applications, e.g. a valet parking application in the parking level 38, wherein the vehicle 10 automatically drives into a desired parking space 44 without requiring motor and steering control of the driver.

While this invention has been described in terms of the preferred embodiments thereof, it is not intended to be so limited, but rather only to the extent set forth in the claims that follow.

We claim:

1. A method comprising:
    acquiring, from a sensor system of a vehicle and based on electromagnetic signals received in a vicinity of the vehicle, a plurality of detection points representing a location in the vicinity of the vehicle;
    determining, from the plurality of detection points and based on a distance between each respective detection point and geometrical objects associated with a predefined map, a subset of detection points;
    determining, for each detection point in the subset of detection points, at least one geometrical object associated with the detection point;
    grouping, into at least one group of detection points, each detection point in the subset of detection points that share a same geometrical object;
    evaluating, based on a quantity of detection points in the at least one group, a weight, expressed on a predefined scale, of each respective detection point in the at least one group; and
    processing each respective detection point in the at least one group with respect to the weight to determine a position of the vehicle.

2. The method according to claim 1, wherein evaluating the weight comprises:
    identifying, from all determined quantities, a maximum quantity with respect to the at least one group of detection points; and
    normalizing all determined quantities to the maximum quantity.

3. The method according to claim 1, wherein processing each respective detection point with respect to the weight comprises modifying a representation of an uncertainty of each respective detection point in accordance with the weight, wherein the representation of the uncertainty is scaled inversely to the weight.

4. The method according to claim 3, wherein the representation of the uncertainty is formed by a predefined covariance matrix, and wherein an inverse representation of the weight is multiplied with at least a portion of the covariance matrix.

5. The method according to claim 1, wherein:
    the weight includes a first weighting factor or a second weighting factor;
    the first weighting factor represents a quantity of detection points in a first group of detection points;
    the second weighting factor represents a quantity of detection points in a second group of detection points;
    the detection points of the first group share a first geometrical object and the detection points of the second group share a second geometrical object;
    the second geometrical object is determined from the predefined map representing the vicinity of the vehicle; and
    the first geometrical object is determined independently from the predefined map.

6. The method according to claim 5, wherein the first geometrical object is defined as an enclosure around a respective detection point, and wherein the enclosure is positioned such that the respective detection point is at least substantially centric in the enclosure.

7. The method according to claim 6, wherein the enclosure has a circular or spherical shape.

8. The method according to claim 5, wherein, the method further comprises:
    for a respective detection point, determining the second geometrical object by identifying, from a plurality of elements of the predefined map, at least one respective element,
    wherein each of the plurality of elements of the predefined map represents a static landmark in the vicinity of the vehicle, and
    wherein the static landmark represented by the at least one respective element is associated with a maximum likelihood of being causal for the location represented by the respective detection point.

9. The method according to claim 8,
    wherein identifying the at least one respective element comprises assigning the element having a minimum distance to the detection point.

10. The method according to claim 8,
    wherein each of the plurality of elements of the predefined map comprises an extended geometrical object, in particular a line or a surface, preferably a straight line or a plane.

11. The method according to claim 5,
    wherein evaluating the weight for a given detection point $p_i$ comprises multiplying the first weighting factor and the second weighting factor,
    wherein the first weighting factor is defined as $$w_1 = e^{-\left(\gamma\left(\frac{M_p - |G_{p_i}|}{M_p}\right)\right)},$$

wherein $M_p$ is a maximum quantity with respect to the first group associated with the given detection point $p_i$, $|G_{p_i}|$ is the quantity of the first group and $\gamma$ is a free parameter, wherein the second weighting factor is defined as $$w_2 = e^{-\left(\sigma\left(\frac{M_{map}-|N_r|}{M_{map}}\right)\right)},$$

wherein $M_{map}$ is the maximum quantity with respect to the second group associated with the given detection point $p_i$, $|N_r|$ is the quantity of the second group, and $\sigma$ is a free parameter.

12. The method according to claim 8, further comprising:
determining, by means of a prefiltering of the plurality of detection points, the subset of the plurality of detection points,
wherein the prefiltering comprises, for each detection point of the plurality of detection points:
identifying, from the plurality of elements of the predefined map, an element having a minimum distance to the detection point; and
assigning the detection point to the subset of the plurality of detection points if the minimum distance to the detection point is below a first predefined threshold.

13. The method according to claim 8, further comprising:
determining, by means of a prefiltering of the plurality of detection points, the subset of the plurality of detection points, wherein the prefiltering for each detection point of the plurality of detection points, comprises:
identifying, from the plurality of elements of the predefined map, an element having a minimum distance to the detection point;
assigning the detection point to the identified element; and
assigning the detection point to the subset of the plurality of detection points if the distance between the detection point and a complementary element is below a second predefined threshold, wherein the complementary element is evaluated on the basis of the detection points being assigned to the identified element, wherein a number of detection points being assigned to the identified element and to the complementary element is maximized.

14. A vehicle comprising:
a processing unit configured to:
acquire, from a sensor system of a vehicle and based on electromagnetic signals received in a vicinity of the vehicle, a plurality of detection points;
determine, from the plurality of detection points and based on a distance between each respective detection point and geometrical objects associated with a predefined map, a subset of detection points
determine, for each detection point in the subset of detection points, at least one geometrical object associated with the detection point;
group, into at least one group of detection points, each detection point in the subset of detection points that share a same geometrical object;
evaluate, based on a quantity of detection points in the at least one group, a weight, expressed on a predefined scale, of each respective detection point in the at least one group; and
process each respective detection point in the at least one group with respect to the weight to determine a position of the vehicle.

15. The vehicle according to claim 14, wherein the processing unit is configured to evaluate the weight by at least:
identifying, from all determined quantities, a maximum quantity with respect to the at least one group of detection points; and
normalizing all determined quantities to the maximum quantity.

16. The vehicle according to claim 14, wherein the processing unit is configured to process each respective detection point with respect to the weight by at least:
modifying a representation of an uncertainty of each respective detection point in accordance with the weight, wherein the representation of the uncertainty is scaled inversely to the weight.

17. The vehicle according to claim 16, wherein the processing unit is further configured to:
form the representation of the uncertainty by a predefined covariance matrix; and
multiply an inverse representation of the weight with at least a portion of the covariance matrix.

18. The vehicle according to claim 14, wherein:
the weight includes a first weighting factor or a second weighting factor;
the first weighting factor represents a quantity of detection points in a first group of detection points;
the second weighting factor represents a quantity of detection points in a second group of detection points;
the detection points of the first group share a first geometrical object and the detection points of the second group share a second geometrical object; and wherein the processing unit is further configured to:
determine the second geometrical object from the predefined map representing the vicinity of the vehicle; and
determine the first geometrical object independently from the predefined map.

19. The vehicle according to claim 18, wherein the first geometrical object is defined as an enclosure around a respective detection point, and wherein the enclosure is positioned such that the respective detection point is at least substantially centric in the enclosure.

20. The vehicle according to claim 19, wherein the enclosure has a circular or spherical shape.

* * * * *